(12) United States Patent
Faxvog et al.

(10) Patent No.: US 8,878,396 B2
(45) Date of Patent: Nov. 4, 2014

(54) CONTINUOUS UNINTERRUPTABLE AC GROUNDING SYSTEM FOR POWER SYSTEM PROTECTION

(75) Inventors: Frederick R. Faxvog, Long Lake, MN (US); Wallace Jensen, Centerville, MN (US); Gale Nordling, Excelsior, MN (US); Greg Fuchs, River Falls, WI (US); David Blake Jackson, Excelsior, MN (US); Terry Lee Volkmann, St. Michael, MN (US); James Nicholas Ruehl, Excelsior, MN (US); Brian Groh, Prior Lake, MN (US)

(73) Assignee: Emprimus, LLC, St. Louis Park, MN (US)

( * ) Notice: Subject to any disclaimer, the term of this patent is extended or adjusted under 35 U.S.C. 154(b) by 684 days.

(21) Appl. No.: 13/159,374

(22) Filed: Jun. 13, 2011

(65) Prior Publication Data

US 2012/0019965 A1    Jan. 26, 2012

Related U.S. Application Data

(60) Provisional application No. 61/366,088, filed on Jul. 20, 2010, provisional application No. 61/408,319, filed on Oct. 29, 2010, provisional application No. 61/430,388, filed on Jan. 6, 2011, provisional application No. 61/437,498, filed on Jan. 28, 2011, provisional application No. 61/486,635, filed on May 16, 2011.

(51) Int. Cl.
| | | |
|---|---|---|
| H01H 47/00 | (2006.01) | |
| H02H 3/52 | (2006.01) | |
| H02H 7/04 | (2006.01) | |
| H02H 1/04 | (2006.01) | |
| H02H 5/00 | (2006.01) | |

(52) U.S. Cl.
CPC . *H02H 3/52* (2013.01); *H02H 7/04* (2013.01); *H02H 1/04* (2013.01); *H02H 5/005* (2013.01)

USPC ............... 307/126; 307/82; 307/87; 307/66; 363/126; 363/132; 361/93.9; 361/93.1; 361/42; 361/627

(58) Field of Classification Search
USPC .......... 307/126, 7, 326, 149, 39, 105; 363/41, 363/37, 51; 361/45, 52; 324/555, 556
See application file for complete search history.

(56) References Cited

U.S. PATENT DOCUMENTS

| | | | |
|---|---|---|---|
| 3,619,723 | A | 11/1971 | Walden |
| 3,916,261 | A | 10/1975 | Zylstra et al. |

(Continued)

OTHER PUBLICATIONS

Superpower Inc. ID#88 (SP-145).*

(Continued)

*Primary Examiner* — Jared Fureman
*Assistant Examiner* — Jagdeep Dhillon
(74) *Attorney, Agent, or Firm* — Merchant & Gould P.C.

(57) ABSTRACT

A continuous grounding system for use in an alternating current system including a transformer is disclosed. The system includes a switch assembly connected between a transformer neutral of a transformer and a ground, the switch assembly having an open position and a closed position, the open position disrupting the path through the switch assembly between the electrical connection and the transformer neutral, and the closed position establishing a path connecting the electrical connection to the transformer neutral through the switch assembly, wherein in normal operation of the alternating current electrical device the switch assembly remains in a closed position. The system also includes a DC blocking component positioned in parallel with the switch assembly and connected between the transformer neutral and the ground. The system further includes a control circuit configured to control the switch assembly, the control circuit including a sensor configured to actuate the switch assembly to an open position upon detection of a predetermined harmonic signal threshold at one of the transformer phases or a predetermined threshold of DC current between the transformer neutral and ground.

29 Claims, 12 Drawing Sheets

(56) References Cited

U.S. PATENT DOCUMENTS

| | | |
|---|---|---|
| 4,153,891 A | 5/1979 | McNutt |
| 4,297,738 A | 10/1981 | Lee |
| 4,654,806 A | 3/1987 | Poyser et al. |
| 5,136,453 A | 8/1992 | Oliver |
| 5,179,489 A | 1/1993 | Oliver |
| 5,390,064 A | 2/1995 | Russo |
| 5,684,466 A | 11/1997 | Keating et al. |
| 5,751,530 A | 5/1998 | Pelly et al. |
| 5,930,099 A | 7/1999 | Legro et al. |
| 5,982,276 A | 11/1999 | Stewart |
| 7,529,069 B1 | 5/2009 | Weems, II et al. |
| 2001/0040458 A1 | 11/2001 | Macbeth et al. |
| 2007/0217103 A1 | 9/2007 | AF Klercker Alakula et al. |
| 2008/0232006 A1 | 9/2008 | Ramirez et al. |
| 2010/0046129 A1* | 2/2010 | Mikrut .................. 361/45 |
| 2010/0097734 A1 | 4/2010 | Birnbach |
| 2010/0195256 A1 | 8/2010 | Birnbach |
| 2012/0019962 A1 | 1/2012 | Faxvog et al. |

OTHER PUBLICATIONS

IEEE: Transactions on Power Delivery, vol. 20, No. 1, Jan. 2005.*
International Search Report and Written Opinion for PCT/US2011/044536 mailed Mar. 27, 2012.
International Search Report and Written Opinion for PCT/US2011/044658 mailed Jul. 12, 2012.
Invitation to Pay Additional Fees with Partial International Search cited in International Application No. PCT/US2011/044536 mailed Nov. 21, 2011 23552 Patent Trademark Office.

* cited by examiner

CONTINUOUS UNINTERRUPTABLE AC GROUNDING SYSTEM FOR POWER SYSTEM PROTECTION

CROSS-REFERENCE TO RELATED APPLICATIONS

The present application claims priority to U.S. Provisional Application No. 61/366,088, filed Jul. 20, 2010, U.S. Provisional Application No. 61/408,319, filed Oct. 29, 2010, U.S. Provisional Application No. 61/430,388, filed Jan. 6, 2011, U.S. Provisional Application No. 61/437,498, filed Jan. 28, 2011, and U.S. Provisional Application No. 61/486,635, filed May 16, 2011. The disclosures of these applications are hereby incorporated by reference in their entireties.

TECHNICAL FIELD

The present disclosure relates generally to an electrical protection device for electrical equipment; in particular, the present disclosure relates to a continuous, uninterruptable AC grounding system useable for power system protection.

BACKGROUND

Electrical equipment, and in particular electrical equipment operating using alternating current, is subject to varying input signals and conditions. In typical arrangements, alternating current devices in the United States expect to receive a 60 Hz power line source (or 50 Hz in Europe) having a predetermined magnitude (e.g., 120 Volts). Although these power sources may vary somewhat, devices made for use with a particular current can typically handle some slight variation in the power signal received.

In some cases, a power signal can vary widely due to harmonics or other external conditions. Harmonics and quasi-DC currents can be the result of, for example, Geomagnetic (Solar)) storms or other electrical equipment, such as switching power supplies, arc equipment, welding equipment, etc., which are on the same power grid or local power circuit. Harmonics and quasi-DC currents can cause the input voltage and current (and resulting power) of a power signal to vary dramatically, causing a potential for damage to electrical equipment connected to that power source.

For example, it is widely recognized that geomagnetic storms or the E3 pulse associated with a high altitude electromagnetic pulse (HEMP) can induce DC or quasi DC currents called Geomagnetic Induced Currents (GIC) in high voltage power generation, transmission, and distribution system components, i.e. power transmission lines and power transformers. These DC currents can cause half cycle saturation in power transformer cores which in turn can result in excessive reactive power losses, heating, damage and/or failure of such transformers. In addition the half cycle saturation can cause the generation of harmonics of the primary frequency (50 or 60 Hz). This harmonic content in turn can cause power system relays to trigger, which can decouple required compensation components. This in turn can result in the collapse of local or wide area portions of a power grid.

Over approximately the last two decades, several suggested approaches for reducing GIC or HEMP (E3) induced currents in power systems have been proposed. These solutions generally take one of a few forms. A first class of solutions uses a capacitive circuit to simultaneously provide the AC grounding path and a block for the induced DC currents. These solutions generally include a set of switches that allow switching between a normal grounded transformer connection and grounding through the capacitive circuit. These solutions can allow for unintentionally open grounding connections to the transformer neutral, or require expensive electronics for handling ground fault conditions. These capacitive circuit solutions may require readjustment of power system relay settings, as compared to current operational parameters.

A second class of solutions generally includes the continuous use of active components used to reduce potentially damaging GIC events from DC or quasi DC currents in the transformer neutral to ground connection. These solutions typically require expensive power electronics, and are constantly active, such that any failure would render these systems unreliable.

A third class of solutions generally uses a resistive approach in which fixed value resistors are used to continuously reduce the DC current in the neutral to ground connection of a transformer; however in these approaches, the resistor typically must have a high resistance value and would only reduce, not eliminate the DC or quasi DC neutral current. Additionally, during the installation of these classes of solutions a readjustment of the power system's relay settings may be required. As such, there exists no solution that provides a reliable, low cost protection circuit compatible with current power delivery systems.

For these and other reasons, improvements are desirable.

SUMMARY

In accordance with the following disclosure, the above and other issues may be addressed by the following:

In a first aspect, a continuous grounding system for use in an alternating current system including a transformer is disclosed. The system includes a switch assembly connected between a neutral grounding connection of a transformer and a ground, the switch assembly having an open position and a closed position, the open position disrupting the path through the switch between the electrical connection and the ground connection, and the closed position establishing a path connecting the electrical connection to the ground connection through the switch assembly, wherein in normal operation of the alternating current electrical device the switch assembly remains in a closed position. The system also includes a DC blocking component positioned in parallel with the switch assembly and connected between the transformer neutral and the ground. The system further includes a control circuit configured to control the switch assembly, the control circuit including a sensor configured to actuate the switch assembly to an open position upon detection of a harmonic signal on one or more of power phases of the transformer or a predetermined threshold of DC current between the transformer neutral and the ground.

In a second aspect, an electrical protection circuit is disclosed. The electrical protection circuit includes a switch assembly connected between a grounding connection of a transformer neutral and a ground, the switch assembly having an open position and a closed position, the open position disrupting the path through the switch between the electrical connection and the ground connection, and the closed position establishing a path connecting the electrical connection to the ground connection through the switch assembly, wherein in normal operation of the alternating current electrical device the switch assembly remains in a closed position. The electrical protection circuit also includes a DC blocking component positioned in parallel with the switch assembly and connected between the transformer neutral and the ground. In the circuit, the switch assembly is movable between the closed position and the open position via an electronic control input, the electronic control input actuating the switch assembly to an open position upon occurrence of a harmonic signal on one or more of power phases of the transformer or a predetermined threshold of DC current between the transformer neutral and the ground.

In a third aspect, a method of protecting electrical equipment in an alternating current circuit from damage due to direct current or harmonic effects is disclosed. The method includes maintaining a switch assembly in a closed position during normal operation of the alternating current circuit, the switch assembly electrically connected between a transformer neutral of the electrical equipment and a ground. The method further includes, upon detecting either a harmonic signal above a predetermined threshold or a DC current above a predetermined threshold, opening the switch assembly, thereby blocking the DC current by a DC blocking component electrically connected in parallel with the switch assembly between the grounding connection of the electrical equipment and the ground.

In a further aspect, a method of testing an electrical protection circuit is disclosed. The method includes opening a switch assembly connected between a transformer neutral and a ground, and injecting an alternating current voltage of a different frequency from a transformer voltage frequency onto the transformer neutral. The method further includes measuring a current through a DC blocking component while injecting the alternating current voltage, and determining if the measured current represents an electrical characteristic within a present limit. If outside the preset limit, the method includes indicating the presence of a failure in the electrical protection circuit.

In another aspect, a method of testing an electrical protection circuit includes injecting an direct current signal onto the transformer neutral, determining whether a switch assembly connected between a transformer neutral and a ground opens in response to the direct current signal, and, if the switch assembly fails to open, indicating the presence of a failure in the electrical protection circuit.

In yet another aspect, a method of testing an electrical protection circuit includes injecting a harmonic signal into the harmonic sensor, determining whether a switch assembly connected between a transformer neutral and a ground opens in response to the harmonic signal, and, if the switch assembly fails to open, indicating the presence of a failure in the electrical protection circuit.

In a still further aspect, an electrical equipment stand includes a top surface having an open structure, a plurality of support legs holding the top surface at an elevation above ground, the support legs mounted onto one or more grounded pilings, and electrical equipment positioned on the top surface and electrically connected between a high power transformer's ground bushing and ground.

DETAILED DESCRIPTION

In general, the present disclosure describes systems and methods for protecting power utility transformers and other electrical or electro-mechanical equipment from damaging DC currents and as a result harmonic content on a power line. Large DC neutral currents and harmonic voltages can be the result of geomagnetic (solar) storms, high altitude electromagnetic E3 pulse (HEMP-E3) or other electrical equipment, such as switching power supplies, arc welding equipment, plasma cutting, electric discharge machining equipment, arc lamps, etc., which are on the same power grid or local power circuit. Overall, the present disclosure describes methods and systems for sensing the harmonic content of a 50 Hz or 60 Hz power line source, and potentially damaging neutral DC currents, to allow critical electrical equipment to be switched to a protective mode of operation in case such harmonics or DC currents are detected.

In accordance with various embodiments described herein, protection of high voltage power systems from GIC (solar storms) and EMP E3 pulses are achieved using a continuous uninterruptable AC grounding circuit which uses a switch-controlled DC blocking mechanism for eliminating geomagnetic and EMP (E3 pulse) induced currents. A DC blocking component (including one or more capacitors, resistors or combinations thereof) is hard wired in place to provide an uninterruptable AC grounding path for the HV power systems, for example to the neutral of "Y" configured HV transformers or autotransformers. Under normal operation a second parallel grounding path provides a very low impedance, standard grounding path through a closed switch assembly.

The continuous grounding systems disclosed herein provide a grounding scheme that is compatible with standard transformer grounding schemes and hence will not require any changes to power system relay settings. When either high DC (or quasi DC) currents or high harmonic power content are detected, a switch assembly is opened, thereby blocking or attenuating the DC or quasi DC current in the system. Blocking the quasi DC or DC currents prevents half cycle saturation of transformers and thereby protects them from excessive reactive power losses, overheating and damage. Additionally, blocking the DC currents prevents the generation of harmonics in partially saturated transformers. Such power harmonics can potentially trip power system relays, which in turn can cause local or wide area power outages. Furthermore, in certain embodiments disclosed herein, the electrical protection circuits included in such a continuous grounding system are designed (configured) to handle ground faults under either the normal or GIC protective mode of operation.

Figure 1:
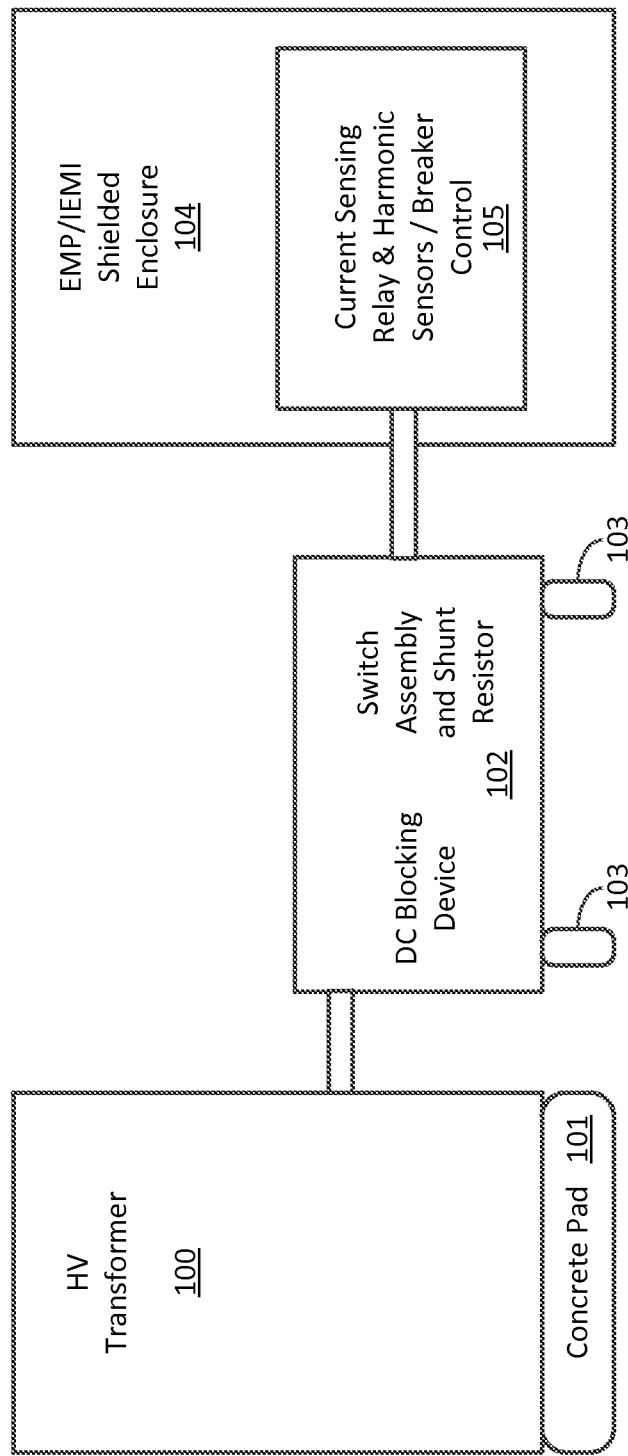
FIG. 1 is a schematic front plan view of a transformer protected using the methods and systems described herein.

FIG. 1 is a schematic front view of example electrical equipment protected according to the features of the present disclosure, and a physical layout of certain components of the present disclosure. In the embodiment shown, a piece of electrical equipment, shown as a high-voltage transformer 100, is electrically connected to an electrical protection circuit 102. The electrical protection circuit 102 can, for example, include at least a portion of the devices described below, according to the embodiments shown in FIGS. 2-9. The high voltage transformer 100 is typically mounted on a concrete pad for stability and isolation from the ground. An electrical protection circuit 102 is electrically connected to the high voltage transformer 100 as discussed above, encased in a housing, and placed on electrically grounded supports 103. In addition to protecting against GIC events, all control electronics (semiconductor devices) are enclosed in an EMP/IEMI shielded and electrically filtered enclosure 104 is electrically connected to the electrical protection circuit 102 and high voltage transformer 100, and includes sensing and switch control circuitry 105. It should be noted that without the shielded and filtered enclosure 104 the system is capable of protect transformers against GIC events but not against EMP E3 pulse threats.

In certain embodiments, the electrical protection circuit 102 includes the switch assemblies and DC blocking components discussed in FIGS. 2-9, while the control system 104 contains sensing and switch actuation circuitry; however, other arrangements of components for an electrical protection device can be provided.

Figure 2:
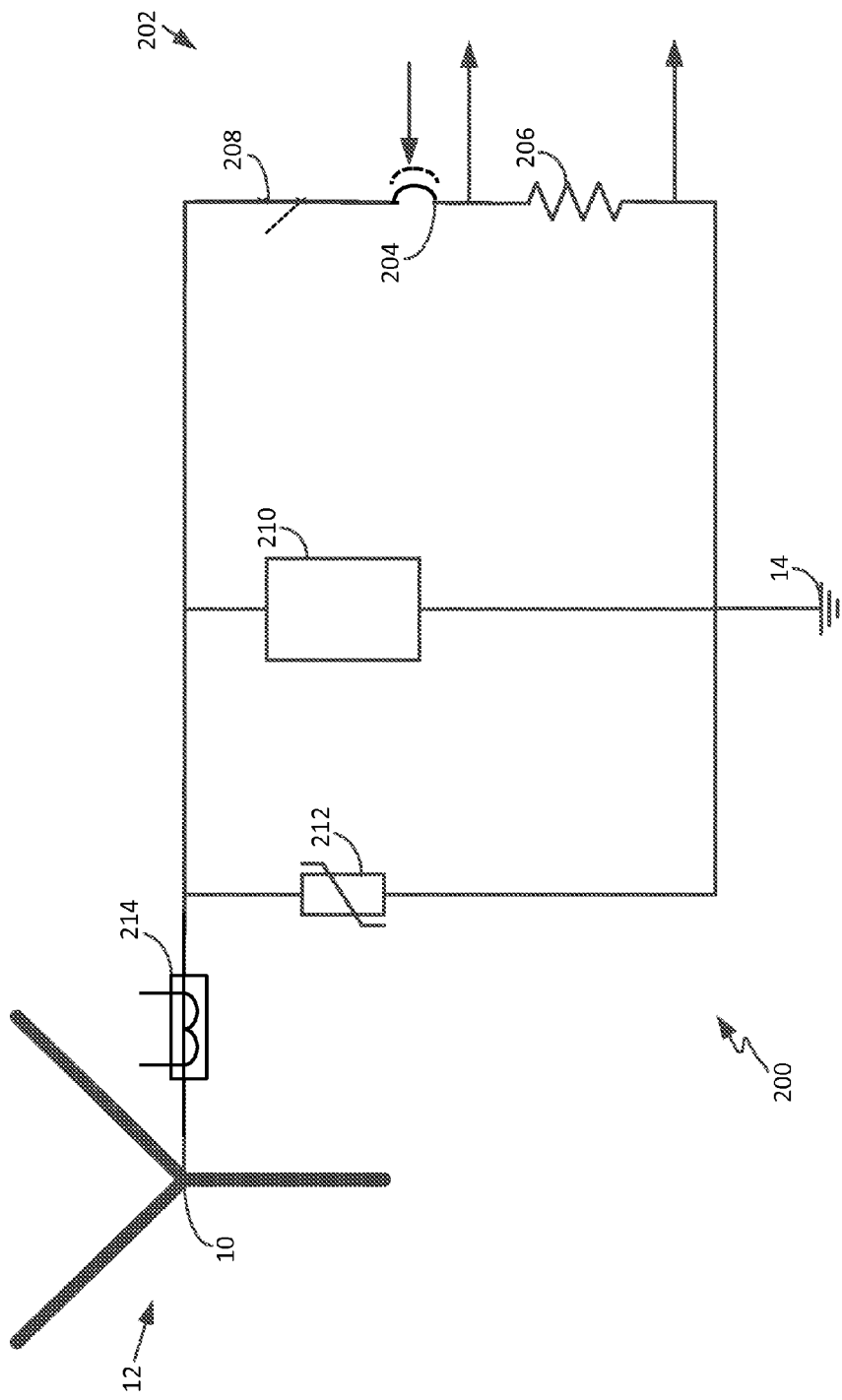
FIG. 2 illustrates an example embodiment of an electrical protection circuit useable within a continuous grounding system, according to a possible embodiment of the present disclosure, as installed at a power generation or distribution site.

Referring now to FIG. 2, a first generalized embodiment of an electrical protection circuit 200 is shown, according to the present disclosure. The circuit 200 generally is connected between a transformer neutral 10 of a transformer 12 (shown as Y-transformer in the embodiment shown) and a ground 14. The electrical protection circuit 200 includes a switch assembly 202 including an electrically controlled switch 204 connected between the transformer neutral 10 and ground 14. A shunt resistor 206 can be connected between the switch 204 and ground 14, which can be used to sense DC current passing between the transformer neutral 10 and ground 14. In certain embodiments, the shunt resistor 206 would typically have a low resistance, on the order of a few milliohms, to allow for a low impedance ground connection through the switches. In another embodiment, the shunt resistor 206 could be replaced by a Hall effect current sensor or other non-contact current sensor. Additionally, an electrically-controlled high voltage grounding switch 208 can be connected between the transformer neutral 10 and the switch 204, for example to protect the switch 204 from high voltages during a ground fault event.

In some embodiments, the ground 14 can be connected to a station ground grid, while in other embodiments it can be connected to the transformer housing which is in turn grounded.

The switch 204 can be any of a variety of fast acting electrically-controlled switches, such as a high voltage circuit breaker switch. In the embodiment shown, the switch 204 is a normally-closed connection which can be opened rapidly via an electrical control input. Example sensing and control circuitry that can be connected to the control input is discussed further in connection with FIG. 3, below.

A DC blocking component 210 is connected in parallel with the switch assembly 202 between the transformer neutral 10 and the ground 14. As further explained in the examples below, the DC blocking component 210 can include one or more direct current blocking devices (e.g., capacitors or resistors) capable of inserting some blocking of a current path between ground 14 and the transformer neutral 10, to prevent damaging DC or quasi DC ground currents in the transformer neutral 10, which would in turn cause possible damage to the transformer 12. Depending on the specific application, either a capacitive or resistive (or some combination thereof) blocking device 210 could be employed in the protection circuit 302. Furthermore, in certain embodiments, the DC blocking component 210 is hard wired to the ground 14, therefore providing an AC ground for the transformer (or other power component) even if the switches 204 and 208 inadvertently malfunction.

In normal operation, the transformer neutral 10 is grounded through the switch assembly 202. That is, the switch assembly 202, including switch 204 and high voltage grounding switch 208, is normally in a closed position. This corresponds to the standard grounding configuration used by utilities; consequently, a grounding system such as is disclosed herein does not require readjustments to the utility electrical equipment to which it is attached prior to use. In this first mode of operation, the DC blocking component 210 is not energized, because the switching assembly creates a short around it. If a ground fault is detected while operating in this normal operational mode (no GIC), the grounding through the switch assembly will handle the ground fault current until the power system relays isolate the faulted equipment. When the presence of either high power harmonics or a quasi DC current in the neutral to ground connection is detected, the switch assembly is opened by the GIC sensing and control electronics. In this second mode of operation the DC blocking component 210 provides the AC grounding for the transformer neutral. This mode of operation protects against DC or quasi DC currents associated with either GIC or EMP E3 events. This GIC protective mode remains operational until a power system operator declares the event to be over and re-closes the switch assembly 202.

In some embodiments, to account for an extremely unlikely event that a GIC and ground fault would occur simultaneously, a surge arrester 212, sometimes known as a varistor or a MOV (metal oxide varistor) or other such surge arresting device, would trigger to protect the blocking components 210. The switch assembly 208 would then be reclosed by a signal from a relay detecting fault current through the transformer neutral current transformer 214 which in turn will trigger the high voltage switch 208 to reclose. Therefore the surge arrester 212 provides the initial grounding within one cycle of the ground fault and until the switch assembly 202 can be reclosed. It is noted that the probability of this simultaneous event (GIC and ground fault) is so small that in practice it may never occur in the lifetime of the system.

To reduce the cost of the surge arrester 212, it may be desirable to use a low cost surge arrester that is a sacrificial device, such that it only protects for one event and will then require replacement. After the surge arrester has been sacrificed, it by its design becomes a short circuit to ground. A second option is to incorporate additional surge arresters in the initial installation with switches such that if the first arrester is sacrificed a second can be switched in as a replacement as needed. A third option is to incorporate a very heavy duty surge arrester in the initial installation that will guarantee that the surge arrester will withstand many ground fault events without failing.

By opening the switch assembly, the DC blocking component 210 shown in FIG. 2 provides the AC grounding path for the transformer neutral 10, while at the same time blocks the DC or quasi DC induced by a geomagnetic storm or EMP E3 event. Blocking the DC both protects the transformer 12 from entering half cycle saturation which in-turn can cause transformer excessive reactive power losses, overheating, damage or even failure. Additionally, blocking the DC also prevents the generation of harmonics in the power system which in-turn can prevent the tripping of power relays, the disconnection of power compensation components, excessive reactive power burden and potentially the collapse of either small or large portions of the power grid.

Further, to increase the reliability of the DC blocking component 210, either a parallel bank of multiple capacitors or resistors could be used such that if one or more of these capacitors or resistors fail the others would still be available as blocking components.

Additionally, to protect against the E1 and E2 portions of an electromagnetic pulse (EMP) and/or Intentional Electromagnetic Interference (IEMI), all the sensitive sensing and control electronics of such a system can be placed in a shielded and electrically filtered enclosure, such as the enclosure containing control system 104 of FIG. 1. All components which are not housed in the shielded enclosure do not contain sensitive semiconductor electronics and hence would survive either an EMP or IEMI event. In an alternative embodiment where the sensing and control electronics are not placed in a shielded and electrically filtered enclosure, the transformer will still be protected against geomagnetic induced GIC. Additional details regarding the contents of such an enclosure are discussed in further detail below.

Figure 3A:
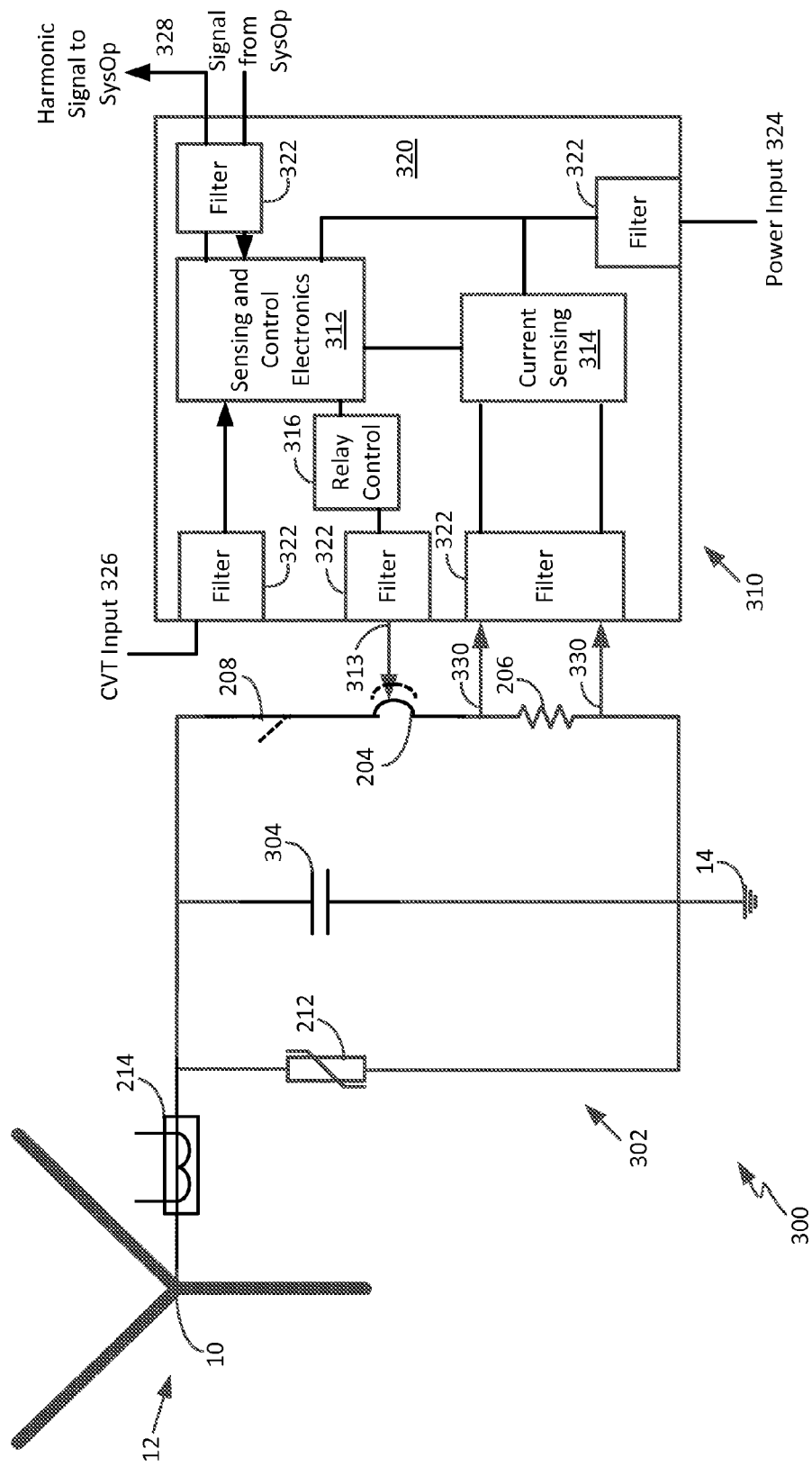
FIG. 3A illustrates a continuous grounding system including a second example embodiment of an electrical protection circuit, according to a possible embodiment of the present disclosure.

Referring now to FIG. 3A, a continuous grounding system 300 is shown including a second example embodiment of an electrical protection circuit 302, according to a possible embodiment of the present disclosure. In this embodiment, the electrical protection circuit 302 generally corresponds to circuit 200 of FIG. 2, but the DC blocking component 208 is illustrated as capacitor 304. Although in certain embodiments a 15 kV, 3000 uF capacitor is used, other types of capacitors could be used as well.

FIG. 3A also illustrates a sensing and control circuit 310, in accordance with a possible embodiment of the present disclosure. The sensing and control circuit 310 includes control electronics, such as a sensing and control module 312, as well as a current sensing unit 314. A relay control circuit 316 is connected to the sensing and control module 312, and generates a switch control output 313 used to actuate the switches 204 and 208.

The sensing and control module 312 sense harmonics which are generated in a half cycle saturated transformer under a GIC event. For example, the module 312 can include a harmonic sensor that will measure the signal form a standard capacitive voltage transformer (CVT) 214 which is located on one of the transformer phases. When the signal from either of the neutral DC current or harmonic sensor exceeds a preset value, a signal is sent to open the two switches in the switching assembly 202. The preset values will be selected by the utility or power system engineers according to the protection requirements of each particular installation. The typical ranges for preset values of DC or quasi DC current are expected to be in the range of about 5-50 amps. The typical ranges for preset values of the power harmonic levels are expected to in the range of about 1% to 10% total harmonic distortion (THD). The current sensing circuit 314 measures neutral DC or quasi DC current caused by a geomagnetic storm across shunt resistor 206, and sends the result of that measurement to the sensing and control module 312 to trigger the relay control circuit 316 as necessary.

In the embodiment shown, the control circuit 310 is enclosed within a shielded enclosure 320, and includes a plurality of filters 322 positioned at a periphery of the enclosure 320 to prevent high frequency, high power electromagnetic signals from entering the enclosure, thereby exposing the sensitive control and sensing electronics to potential interference and damage. The filters 322 can typically be a low pass or band pass filter with surge suppression to suppress any high voltage signals from entering the enclosure. In the embodiment shown, the shielded enclosure 322 is an EMP/IEMI faraday shielded enclosure with conductive gaskets around all door openings to provide radiative protection from electromagnetic frequencies typically from about 14 kHz to 10 GHz. Additionally, in the embodiment shown, a filter 322 is positioned on a power input 324, as well as on a CVT input 326, operator inputs and outputs 328, the switch control output 313, and current sensing inputs 330 connecting across either side of the shunt resistor 206. Additionally, any fiber communications in and out of the enclosure 320 will be filtered via an appropriate waveguide-beyond-cutoff penetration, which will inherently provide protection against EMP and IEMI events.

In operation, when a GIC event is detected by the control circuit 310, the low DC voltage switch, i.e. switch 204, will be opened by the relay control circuit 316, via switch control output 313. Following this action a signal will open the high voltage grounding switch 208. The grounding switch 208 will then typically remain open for the duration of the geomagnetic storm event, typically on the order of a few hours to a day. During this period the DC blocking component 210, in this case capacitor 304, provides the AC ground for the transformer neutral 10 of transformer 12. The reclosing of the grounding switches 204 and 208 will typically be controlled by the operator of the power system after the geomagnetic storm has passed. However, some utility installations may prefer to configure their system to reclose the switches automatically, e.g., after a predetermined period of time.

Figure 3B:
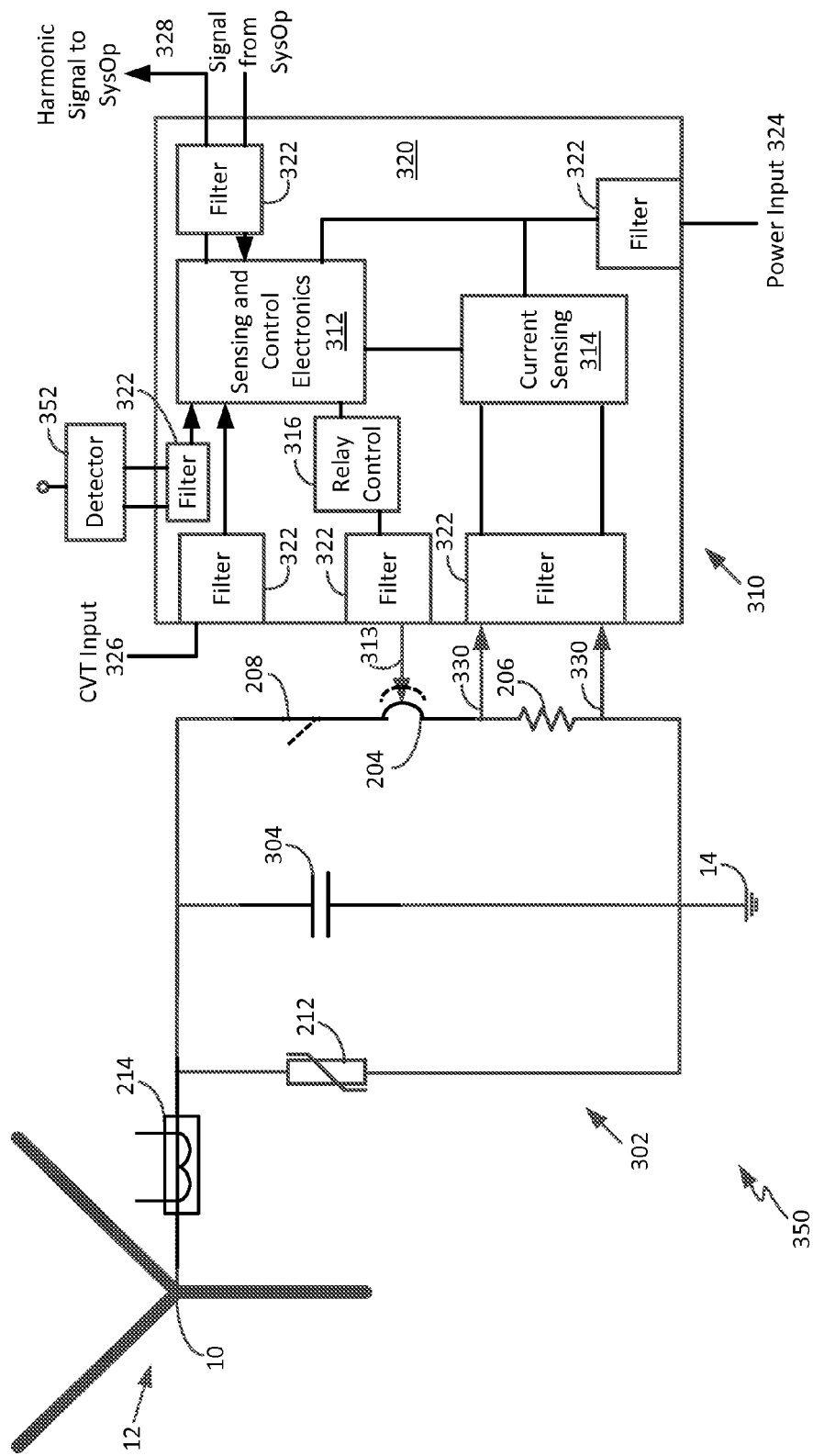
FIG. 3B illustrates a continuous grounding system including a second example embodiment of an electrical protection circuit, according to a further possible embodiment of the present disclosure.

Referring now to FIG. 3B, a further example embodiment of a continuous grounding system 350 is shown. In this example embodiment, a Hall Effect current sensor could alternatively be used in place of the shunt resistor 206 and current sensing device 314 for measuring the DC current in the transformer neutral to ground connection. In such embodiments, the Hall Effect sensor would be sacrificed by either an EMP or IEMI attack. There is also a question whether the Capacitive Voltage Transformer (CVT) 214 would likewise be sacrificed by an EMP or IEMI attack.

To ensure that the transformer protection would continue its protection function under such an attack an Electromagnetic (EM) Field, a detector 352 could be added to this protection system as shown, connecting to the sensing and control electronics 312 via a filter 322. The detector 352 resides outside of the enclosure 320, and would allow the detection of either the EMP E1 or E2 pulse or an IEMI pulse which in turn would be used to open the DC switch 204 and hence switch in the necessary transformer protection. The EM detector 352 could be mounted on the top or side of the control house and be connected by a shielded conduit to the protected control electronics 310.

In various embodiments, different types of electromagnetic field detectors could be used. In example embodiments, electromagnetic field detectors could include those described in copending U.S. patent application Ser. No. 12/906,902, entitled "Electromagnetic Field Detection Systems and Methods", the disclosure of which is hereby incorporated by reference in its entirety.

In operation, even if a Hall Effect sensor and/or the CVT 214 were damaged or destroyed by an electromagnetic event, the EM detector 352 would open the DC switch 204 which in turn would protect the HV transformer 10.

Figure 4:
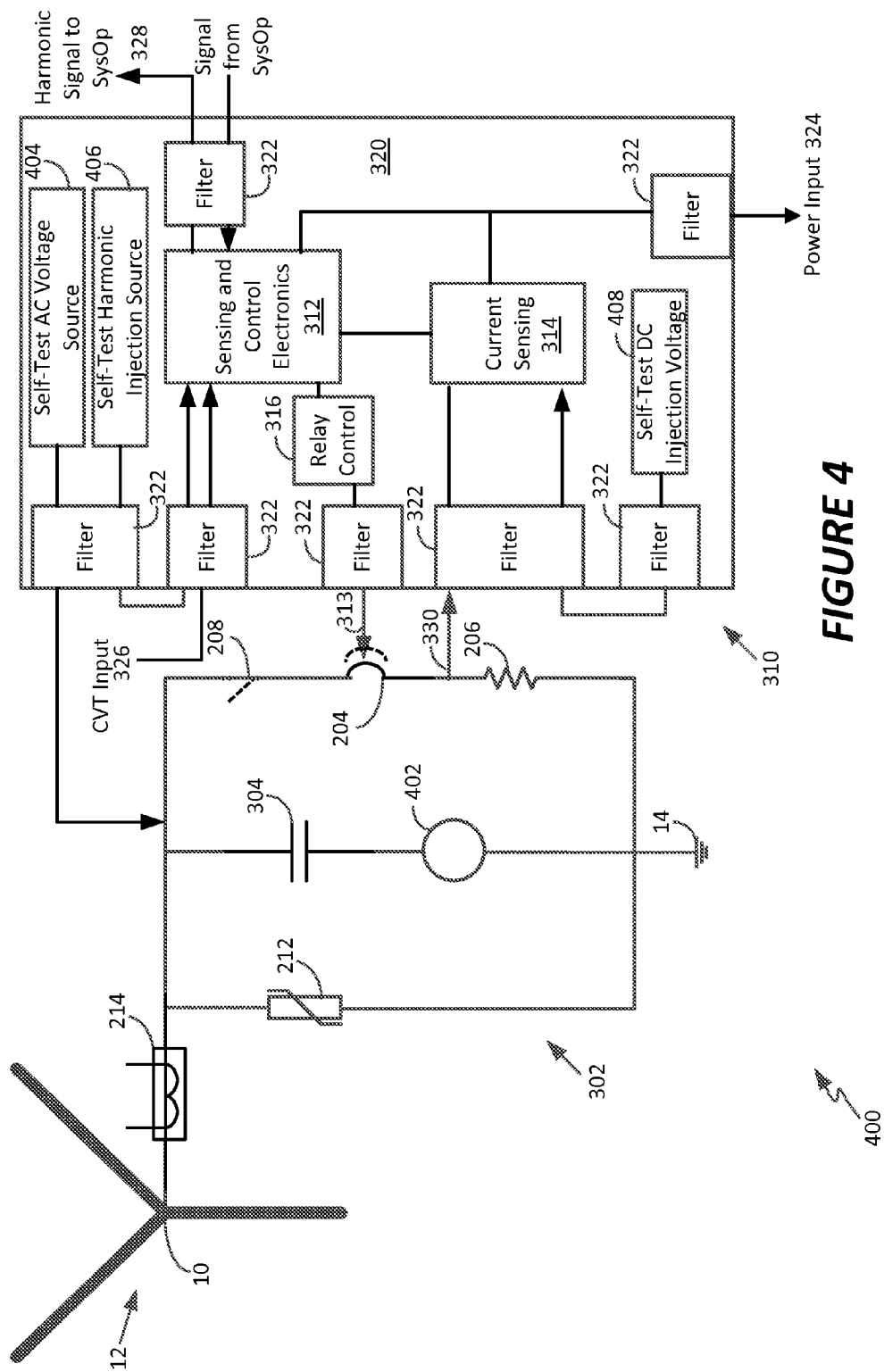
FIG. 4 illustrates a method for self-testing a direct current blocking device, according to a possible embodiment of the present disclosure.

Referring now to FIG. 4, a test arrangement 400 using the continuous grounding system 300 of FIG. 3 is shown in which a self-testing procedure can be performed. According to various embodiments of the present disclosure, the test arrangement 400 allows for either manual or automatic testing (e.g., on a preset interval). According to the embodiment shown, one example test can be accomplished by opening the switch assembly 202 and injecting a voltage of a different frequency from that of the power system (50 or 60 Hz or a harmonic thereof) into the transformer neutral connection, for example using an AC voltage source 404, and simultaneously measuring the current through the capacitor at this test frequency. The value of this current along with the value of the injected voltage gives a measure of the capacitance (or resistance) of the capacitor (or resistor). The capacitance C is simply given by:

$C=I/\omega V$ where I is the current through the capacitor, V is the injected voltage and $\omega$ is the angular frequency of the injected voltage ($\omega=2\pi f$). For the case of a resistor blocking device the resistance is given by $R=V/I$.

Therefore if the measured capacitance (or resistance), at the frequency of the injected signal, is in a nominally acceptable range of its initially installed specified value then this self test verifies that the capacitor (or resistor) is in working condition and is ready for either a GIC or EMP E3 event. If the capacitance (or resistance) is outside of a given acceptable range then a message will be generated that the protection system needs further diagnostics to determine the root cause of the non-compliant capacitance reading. And if the capacitor (or resistor), switches or other components are not functioning properly, a replacement order for the faulty component or components may be required.

If a resistor is used as the DC blocking device, a similar self test can be performed as for the capacitor case presented above. In this case the injected signal would be used to measure the resistance of the resistor to ensure that it meets the specified value.

To protect against EMP E1 and E2 pulses, the voltage and harmonic injection sources 404, 406, 408 used in this self test configuration will be housed inside the shielded enclosure 320 with the other sensitive electronic components in this test arrangement 400. The current sensor 402 used in this self test configuration could be a Hall Effect current sensor which since it is a semiconductor device with an integrated amplifier would be sacrificed by an EMP or high power IEMI event.

The test arrangement 400 of FIG. 4 also illustrates an arrangement in which testing the electronic sensing and control electronics can be performed. The testing can be performed either manually or automatically on a preset interval. This additional test can be performed by injecting a DC signal into the transformer neutral connection using a DC injection voltage component 408, thereby creating a DC current through the switch assembly 202 and through the shunt resistor 206. If the sensing and control electronics are working properly, this will simulate the presence of a DC GIC current and cause the switch assembly to open. The switches can then be reclosed to go back to the normal operation mode. In a similar manner, a harmonic signal can be injected into the CVT 214 connection from harmonic signal generator 406, thereby simulating a GIC harmonic event. If the harmonic sensing and control electronics are working properly, this will cause the switch assembly to open. The switches can then be reclosed to go back to the normal operation mode.

Figure 5:
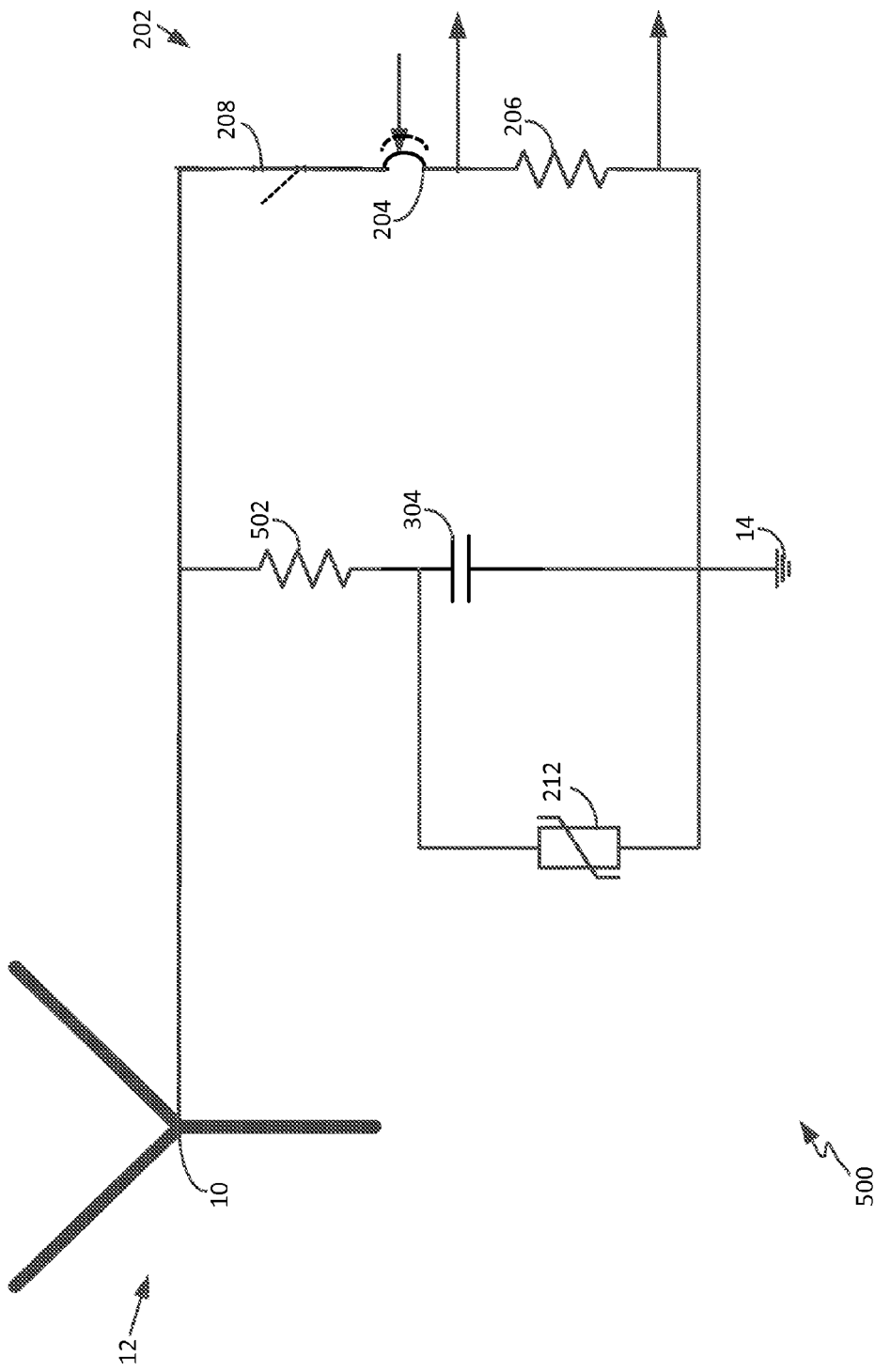
FIG. 5 illustrates a further example embodiment of an electrical protection circuit, according to a possible embodiment of the present disclosure.

FIG. 5 illustrates a further example embodiment of an electrical protection circuit 500, according to a possible embodiment of the present disclosure. In this embodiment, a resistor 502 is positioned in series with the capacitor 304 of FIGS. 3-4, to prevent ferro-resonances caused by the combination of the capacitor and transformer inductance. In this arrangement, the surge arrester 212 remains in parallel with the capacitor 304, but not the resistor 502. Typically the resistance of resistor 502 would be on the order of a few (0.5-3) ohms or less to match the impedance of the capacitor 304 for a 50-60 Hz system. For this embodiment, all of the switching components and GIC sensing electronics remain the same as that shown in FIGS. 3-4.

Figure 6:
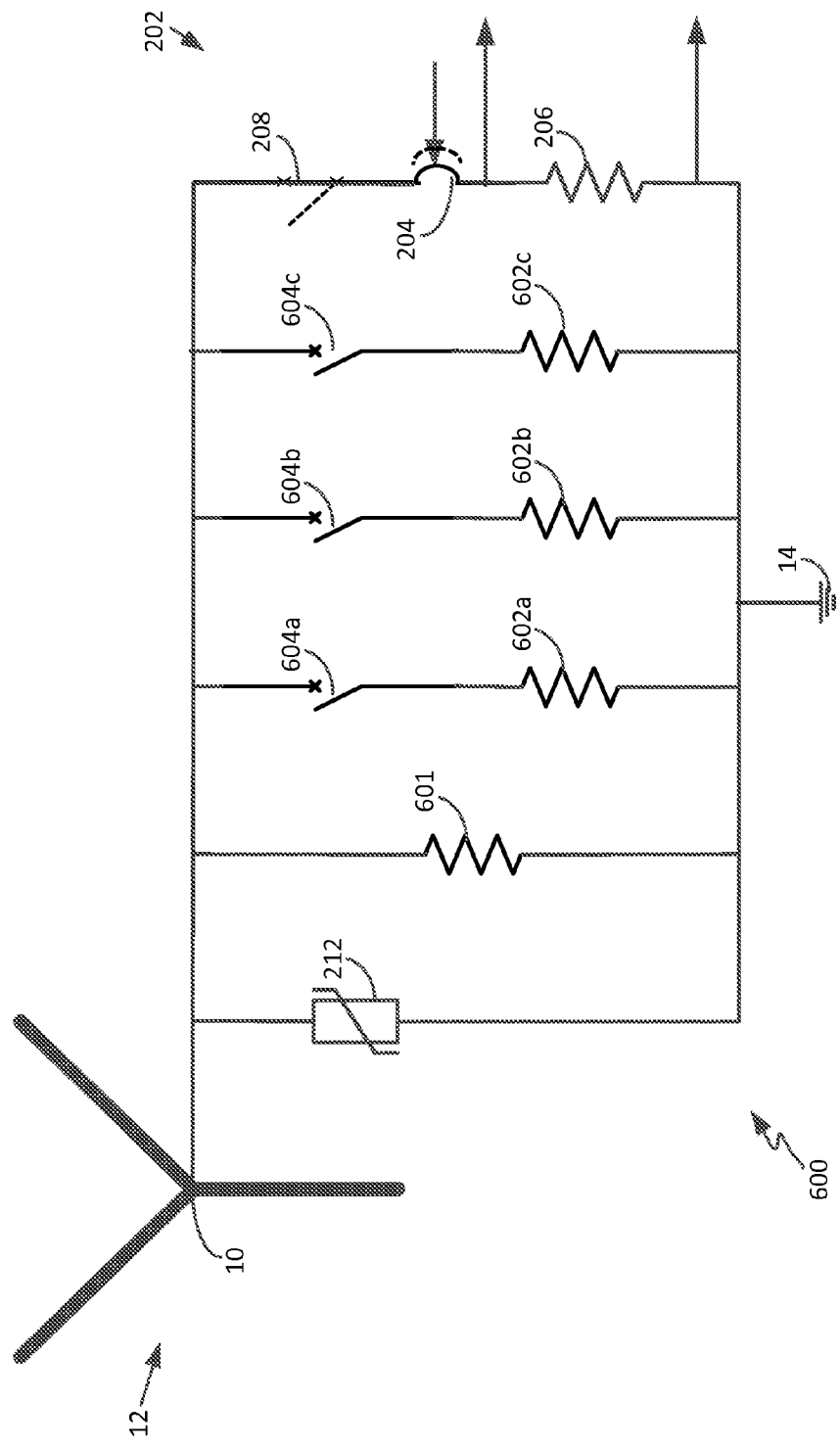
FIG. 6 illustrates an example embodiment of an electrical protection circuit including variable levels of resistance, according to a possible embodiment of the present disclosure.
Figure 7:
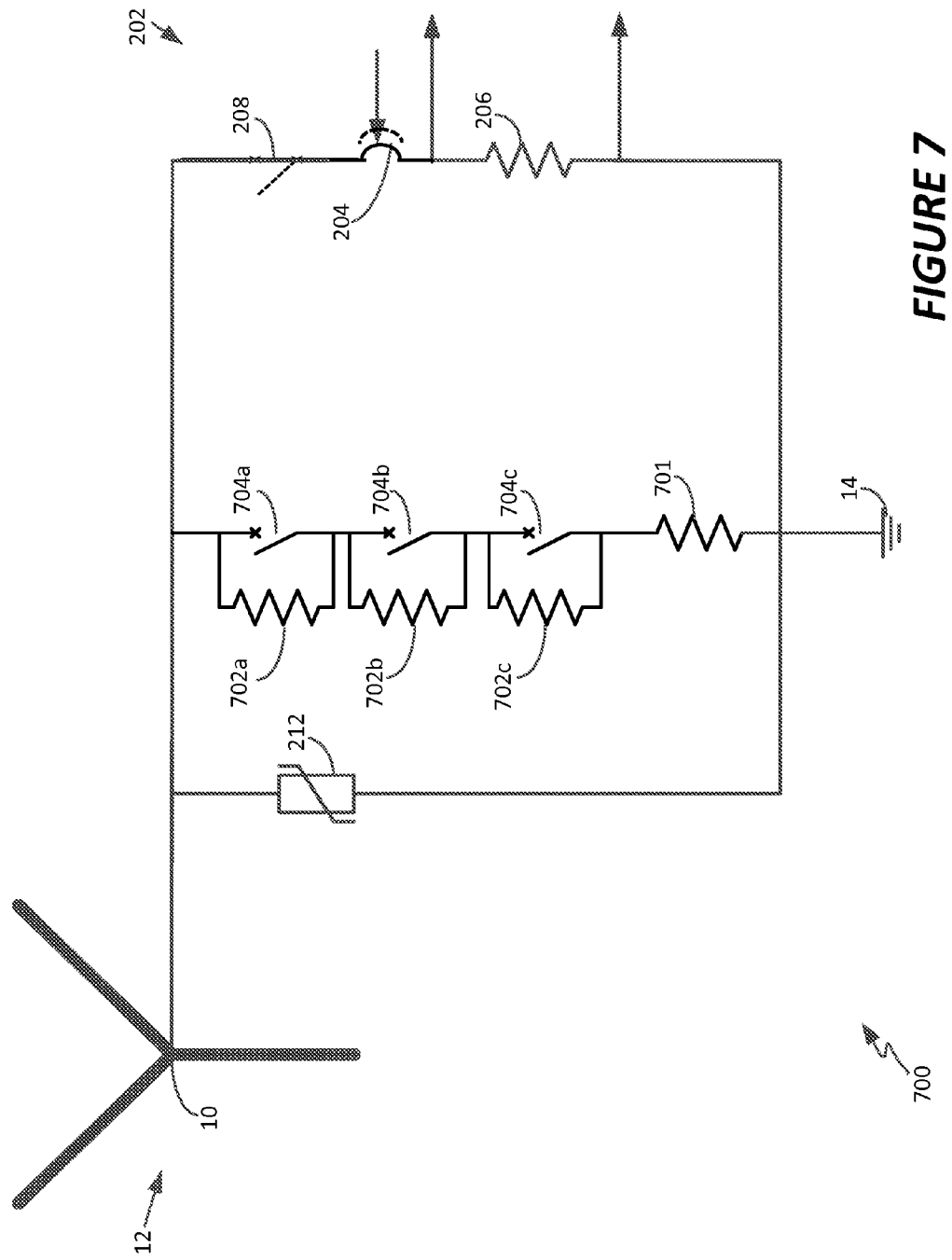
FIG. 7 illustrates a second example embodiment of an electrical protection circuit including variable levels of resistance, according to a possible embodiment of the present disclosure, line.

In FIGS. 6-7, additional embodiments are shown in which variable levels of resistance can be applied as part of the DC blocking component 210. In FIG. 6, an electrical protection circuit 600 includes a bank of parallel resistors 602a-c with associated switches 604a-c connected in series with each resistor 602 are used to provide various levels of protection for geomagnetic storms or the E3 portion of an EMP event. The number of parallel resistors 602 and associated switches 604 can be adjusted according to the range of DC blocking or attenuating required at the specific installation. In this embodiment, the control circuit 310 will include a number of preset harmonic and neutral DC current threshold levels to control the switches which will sense the severity of the event to be able to control the number of resistors 602 that will be switched into service. In the embodiment shown, a further resistor 601 is included in parallel with resistors 602a-c to ensure some level of resistance when all of the switches are open.

In FIG. 7, an electrical protection circuit 700 includes a bank of series resistors 702a-c and associated switches 704a-c connected in parallel, which are used to provide various levels of protection for geomagnetic storms or the E3 portion of an EMP event. An additional resistor 701 is positioned in series with resistors 702a-c, to ensure that when switches 704a-c are closed some resistance remains in the path between the transformer neutral 12 and ground 14. The number of series resistors 702 and associated switches 704 can be adjusted according to the range of DC blocking or attenuating required at the specific installation. In this embodiment the sensing and control electronics will again need to be able to sense the severity of the event to be able to control the number of resistors that will be switched into service.

Figure 8:
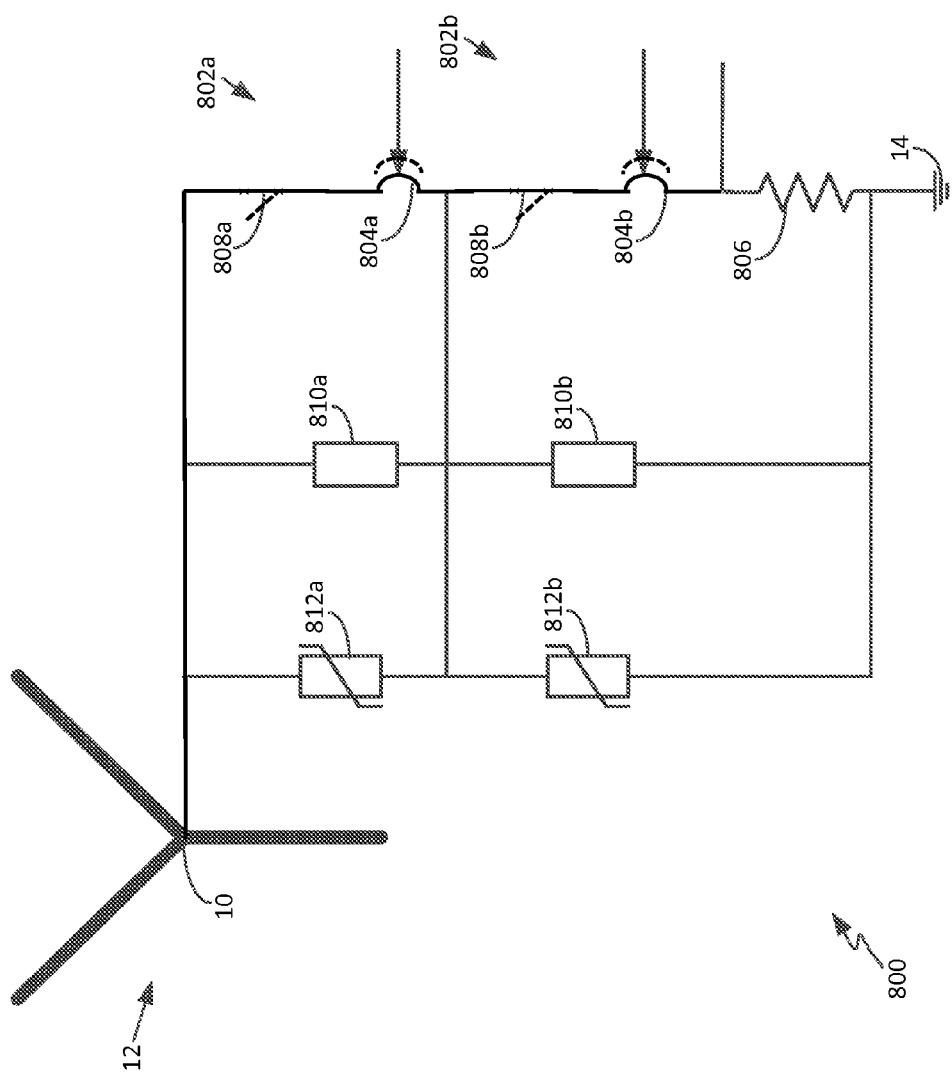
FIG. 8 illustrates a further example embodiment of a continuous grounding system using a resistive and capacitive circuit network, according to a further possible embodiment of the present disclosure.

FIG. 8 illustrates a further example embodiment of a continuous grounding system 800, according to a further possible embodiment of the present disclosure. The continuous grounding system 800, as compared to those described above, generally includes multiple resistors and switches used to protect the transformer 10, for example from either a high geomagnetic induced current (GIC) or high total harmonic signals at the transformer. In comparison to the electrical protection system 200 of FIG. 2, the system 800 includes a voltage divider circuit with blocking components 810*a* and 810*b* in series, with parallel surge arresters 812*a-b* and parallel switch assemblies 802*a-b*. Each of the switch assemblies 802*a-b* includes a high voltage ground switch 808*a-b* and a DC switch 804*a-b*. Use of multiple switch assemblies allows for a decrease the stand-off voltage requirements for the high voltage ground switches 808*a-b*. Reducing this stand-off voltage requirement allows for the use of standard off-the-shelf high voltage grounding switches 808.

Figure 9:
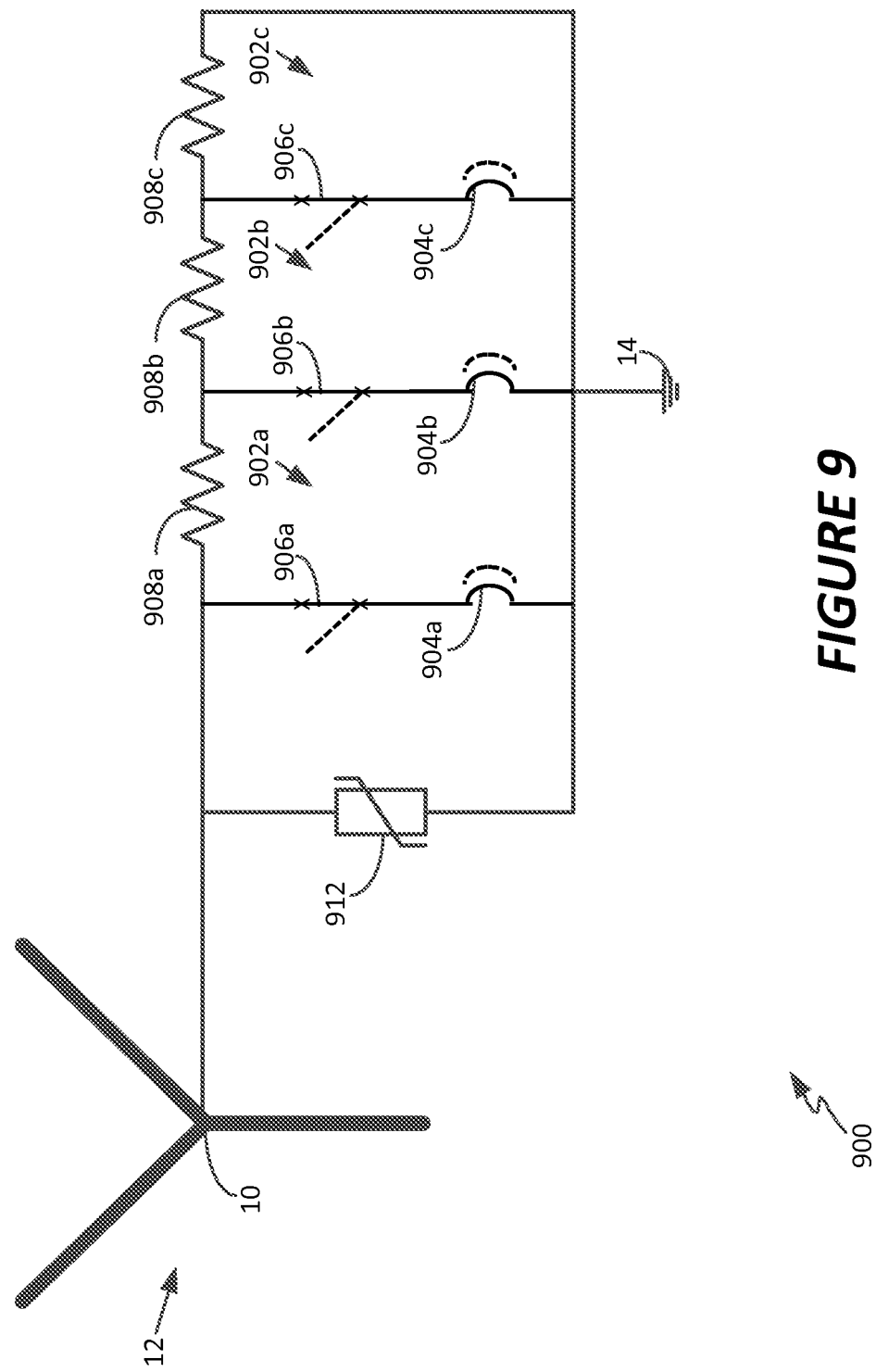
FIG. 9 illustrates a further example embodiment of a continuous grounding system, according to the principles of the present disclosure.

FIG. 9 is a further example schematic illustration of a circuit 900 used in an electrical protection device, according to a further possible embodiment. In this embodiment, the circuit 900 is generally analogous to that illustrated in FIG. 5, but uses additive resistors connected in series. In this embodiment, a plurality of switch assemblies 904*a-c*, and 906*a-c* are connected in parallel, each allowing connection of one of a series of resistors 902*a-c*. In the embodiment shown, the resistors 902*a-c* have a typical 2 ohm resistance; however, other resistive values could be used as well. Between each of the resistors, a separate switches 904*a-c* and 906*a-c* connect to ground 14. Each switch 904*a-c* is connected in series with a protecting grounding switch 906*a-c*. Specifically, in this embodiment, more blocking resistance can be added into the circuit by progressively opening switch assemblies 904*a-c* and 906*a-c*.

Although in the embodiments of FIGS. 6-7 and 9 three resistor arrangements are used, it is understood that additional numbers of resistors could be used as well.

Although in the embodiments shown certain circuit values are provided, it is recognized that other circuit components or circuit values could be used as well consistent with the discussion in the present specification.

Figure 10:
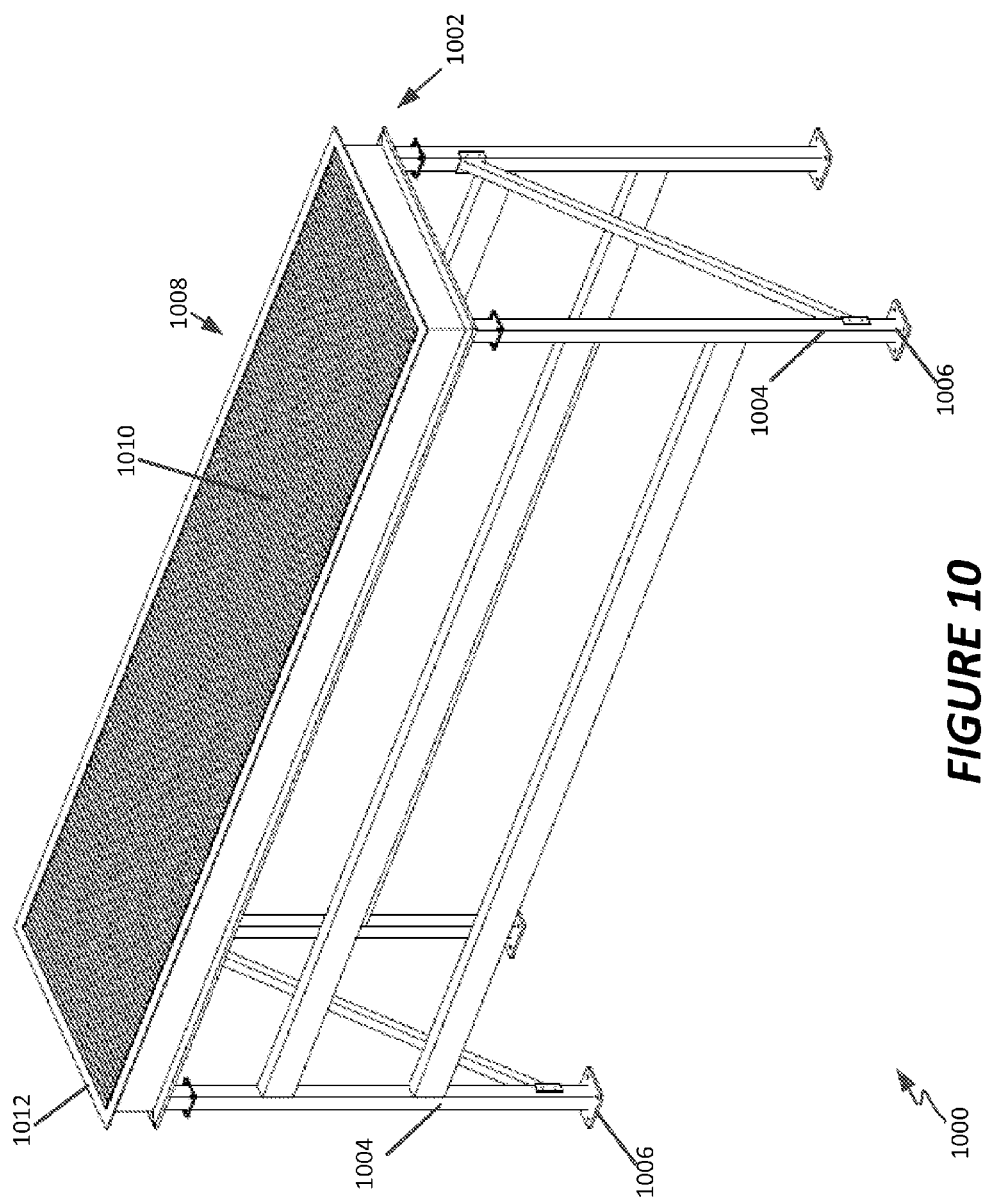
FIG. 10 is a perspective view of an example electrical equipment stand, according to a possible embodiment of the present disclosure.

Referring now to FIG. 10, an example equipment stand 1000 is shown. The equipment stand 1000 can be used to store and protect circuitry, such as is shown in FIGS. 2-9, above, at a power station, or in some other location near electrical equipment to be protected. In some embodiments, the equipment stand 1000 represents an embodiment of a structure upon which the electrical protection circuit 102 of FIG. 1 can be mounted.

In the embodiment shown, the equipment stand 1000 includes a platform 1002 supported by a plurality of support legs 1004. Each of the support legs 1004 is affixed to and stands upon a piling 1006. Each piling 1006 is preferably either poured or otherwise submerged below ground, and provides a resilient base upon which the equipment stand resides.

The platform 1002 of the equipment stand 1000 includes a top surface 1008 having an open structure 1010 supported by a frame 1012. In some embodiments, the open structure 1010 is grated, meshed, or otherwise arranged such that water or snow cannot accumulate on that surface. The platform structure will typically be electrically grounded according to power industry standards.

In the embodiment shown, the overall stand 1000 is between about 6 feet wide by 3 feet deep by about 10 feet tall. In other embodiments, the stand 10 is about 10 feet wide by about 4 feet deep by about 10 feet tall. In a further embodiment, the stand 10 is about 16 feet wide by about 4 feet deep by about 10 feet tall. Other sizes could be used as well.

In the embodiment shown, the equipment stand 1000 is constructed from galvanized steel, including the support legs and top surface. The pilings 1006 can be concrete or some other resilient material including appropriate screw anchors.

In alternative embodiments, the equipment stand 1000 can be constructed from alternative metal or otherwise rigid and weather-resistant material.

Overall, the equipment stand 1000 provides a relatively small foot print and low cost structure that can be assembled in a factory and is collapsible for easy shipping. The stand 1000 is constructed such that it is easy to re-assemble at the power sub-station site.

Figure 11:
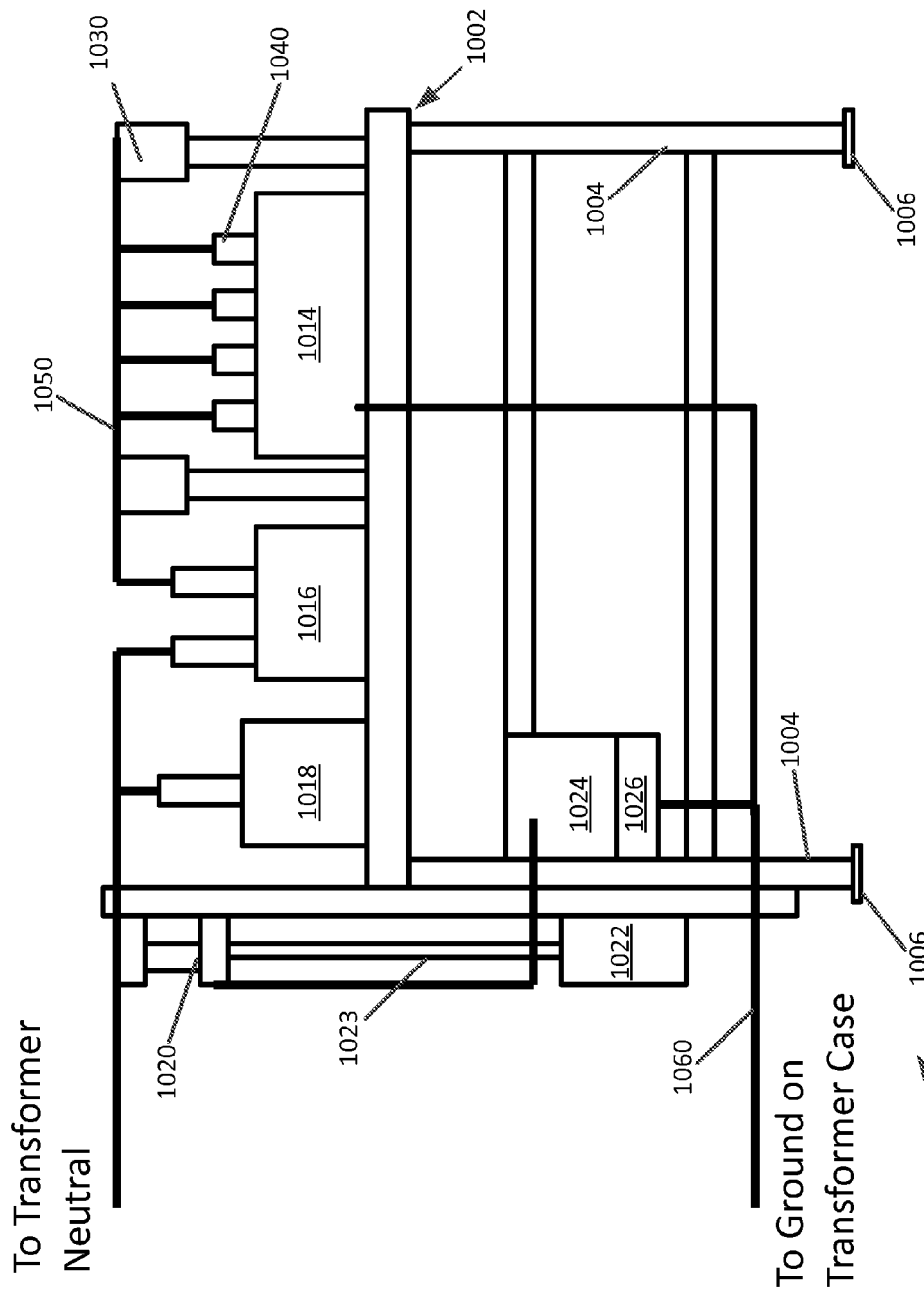
FIG. 11 is a schematic front plan view of the electrical equipment stand of FIG. 10 having electrical equipment mounted thereon, according to a possible embodiment of the present disclosure.

As further illustrated in connection with FIG. 11, the equipment stand 1000 is generally constructed to support any necessary electrical protection components that may be used to block harmful DC neutral currents which can arise from either a geomagnetic storm (Geomagnetic Induced Current—GIC) or an E3 Pulse associated with an Electromagnetic Pulse (EMP) weapon. The components shown in FIG. 11 on the stand 1000 are a capacitor bank 1014, a high power resistor 1016, and a surge arrestor 1018. The capacitor bank 1014 can include one or more capacitors, and can be of any of a number of different configurations. In one example embodiment, the capacitor bank 1014 can correspond to capacitor 304, described above. The resistor 1016 can be, for example, a one ohm power resistor configured to withstand high current applications. In certain embodiments, the resistor 1016 can correspond to power resistor 502 described above.

In the embodiment shown, the capacitor bank 1014 is connected in series with the resistor 1016 between a grounding location and a neutral of a high voltage transformer. In some embodiments, the resistor 1016 is separated from a grounding connection via the equipment stand by an insulating pad (not shown) placed beneath the resistor 1016 on the open structure 1010. Other electrical isolation techniques could be used as well.

The surge arrester 1018 is connected between a grounding point and the neutral of the high voltage transformer. In some embodiments, the surge arrester 1018 corresponds to surge arrester 212 described above. In certain embodiments, the surge arrestor 1018 has a metal protective box over it which is open on the bottom such that if the arrestor should enter its pressure relief mode, any released gases or debris will be directed toward the ground so as to not damage any other equipment. Any equipment housed on the stand below the surge arrestor will be suitably shielded to prevent damage to such devices.

On the top left side of the stand 1000 is a high voltage grounding switch 1020. The grounding switch 1020 is connected to a motor drive 1022 by a shaft 1023 extending from the bottom of the stand 1000. On the bottom of the stand 1000 is a DC disconnect switch 1024 and a shunt resistor 1026. The DC disconnect switch 1024 allows the circuitry on the stand 1000 to be disconnected from a high voltage transformer for servicing.

Optionally, control electronics can be included at a location near the equipment stand 1000 for controlling one or more of the electrical components. In some embodiments, the control electronics can be housed in an electrically shielded enclosure to prevent damage to the electronics.

To electrically interconnect the various components, one or more electrical conductors 1050 and the ground electrical conductor 1060 are employed. The conductor 1050 is mounted on several high voltage insulators 1030. Electrical bushings 1040 are also shown on the tops of the capacitors, power resistor and the surge arrester. The EMP and IEMI protected electronics (e.g., electronics 310 described above) will typically, but not always, be housed in the sub-station control house (building).

Additionally, in certain embodiments, and for safety reasons, the stand 1000 will have a suitable fence around the bottom such that a person cannot enter the area underneath the stand.

Furthermore, although in the embodiment shown a particular arrangement of electrical equipment is shown, in alternative embodiments other electronic connections are possible as well. Example electrical connections are illustrated in conjunction with FIGS. 2-9, above.

Overall, it is recognized that various embodiments of the present disclosure provide a number of advantages with respect to circuit protection, particular with respect to either harmonic signals or DC current signals at a grounding connection of AC electrical equipment, such as a transformer used for power generation or distribution. For example, blocking the DC or quasi DC neutral current prevents half cycle saturation in the transformer core which in turn prevents transformer over-heating, damage or failure. Additionally the DC blocking also improves the power quality by reducing harmonics which can activate power system relays and cause major instabilities as well as power outages. This largely prevents the tripping of utility power system relays, the disconnection of power compensation and other critical components, and in turn avoids the partial or total collapse of a power grid in the event of GIC or EMP events.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A continuous grounding system for use in an alternating current system including a transformer, the system comprising:
   (a) a switch assembly connected between a transformer neutral of a transformer and a ground, the switch assembly having an open position and a closed position, the open position disrupting the path through the switch between the electrical connection and the ground connection, and the closed position establishing a path connecting the electrical connection to the ground connection through the switch assembly, wherein in normal operation of the alternating current electrical device the switch remains in a closed position;
   (b) a DC blocking component positioned in parallel with the switch assembly and connected between the transformer neutral and the ground; and
   (c) a control circuit configured to control the switch assembly, the control circuit including a sensor configured to actuate the switch assembly to an open position upon detection of a harmonic signal in at least one phase of the transformer or a predetermined threshold of DC or quasi DC current between the transformer neutral and the ground.

2. The continuous grounding system of claim 1, wherein the DC blocking component is a capacitor connected in parallel with the switch assembly, between the transformer neutral and the ground.

3. The continuous grounding system of claim 1, wherein the control circuit includes a harmonic sensor configured to detect harmonic signals in at least one phase of the transformer.

4. The continuous grounding system of claim 1, wherein the control circuit includes a current sensor configured to detect DC or quasi DC current flowing between the transformer neutral and the ground through the switch assembly.

5. The continuous grounding system of claim 1, wherein the DC blocking component includes a plurality of resistors, each of the resistors selectively added to the DC blocking component by a corresponding switch assembly.

6. The continuous grounding system of claim 5, wherein each of the plurality of resistors are connected in series between the transformer neutral and the ground, and wherein a switch associated with each resistor is connected in parallel with that switch assembly, whereby opening each switch assembly adds the associated resistor to the DC blocking component.

7. The continuous grounding system of claim 5, wherein each of the plurality of resistors are connected in parallel between the transformer neutral and the ground, and wherein a switch assembly associated with each resistor is connected in series with that switch assembly, whereby closing each switch assembly adds the associated resistor to the DC blocking component.

8. The continuous grounding system of claim 5, whereby a total resistance of the DC blocking component can be adjusted depending on a severity of the DC or quasi DC current or the harmonic signal.

9. The continuous grounding system of claim 1, further comprising an overvoltage protection element electrically connected in parallel with the DC blocking component and between the transformer neutral and the ground, the overvoltage protection element configured to protect against concurrent geomagnetically induced currents and ground faults occurring in the continuous grounding system.

10. The continuous grounding system of claim 1, further comprising a shunt resistor electrically connected in series with the switch assembly, between the switch assembly and the ground.

11. The continuous grounding system of claim 1, further comprising a Hall Effect current sensor connected in series with the switch assembly, between the switch assembly and the ground.

12. The continuous grounding system of claim 1, further comprising a protection switch electrically connected in series with the DC switch, between the DC switch and the transformer neutral, the protection switch configured to protect the DC switch against high voltages.

13. The continuous grounding system of claim 1, wherein the control circuit is housed within an electromagnetically shielded enclosure, the control circuit further including a plurality of filters positioned at a periphery of the electromagnetically shielded enclosure and configured to protect against damage to the control circuit by electromagnetic interference, intentional electromagnetic interference (IEMI) and electromagnetic pulse (EMP) radiation impinging on the electromagnetically shielded enclosure.

14. The continuous grounding system of claim 13, wherein the switch assembly is located separately from but electrically connected to the electromagnetically shielded enclosure.

15. The continuous grounding system of claim 13, further comprising an electromagnetic field detector electrically connected to the control circuit and positioned external to the electromagnetically shielded enclosure.

16. An electrical protection circuit comprising:
   (a) a switch assembly connected between a transformer neutral of a transformer and a ground, the switch assembly having an open position and a closed position, the open position disrupting the path through the switch assembly between the electrical connection and the transformer neutral, and the closed position establishing a conductive path connecting the electrical connection to the transformer neutral through the switch assembly, wherein for normal operation of the alternating current electrical device the switch assembly remains in a closed position; and (b) a DC blocking component positioned in parallel with the switch assembly and connected between the transformer neutral and the ground;

wherein the switch assembly is movable between the closed position and the open position via an electronic control input, the electronic control input actuating the switch assembly to an open position upon occurrence of a harmonic signal in at least one phase of the transformer or a predetermined threshold of DC or quasi DC current between the transformer neutral and the ground.

17. The electrical protection circuit of claim 16, wherein the DC blocking component is selected from the group consisting of: one or more capacitors; and one or more resistors.

18. The electrical protection circuit of claim 16, wherein a total resistance of the DC blocking component is adjustable to accommodate a severity of the DC or quasi DC current or severity of the harmonic signal.

19. The electrical protection circuit of claim 16, further comprising an overvoltage protection element electrically connected in parallel with the DC blocking component and between the transformer neutral and the ground, the overvoltage protection element configured to protect against ground faults that occur concurrently with the protection circuit being in a blocking mode.

20. A method of protecting electrical equipment in an alternating current circuit from damage due to direct current or harmonic effects, the method comprising:

maintaining a switch assembly in a closed position during normal operation of the alternating current circuit, the switch electrically connected between a neutral of the electrical equipment and a ground; and upon detecting either a harmonic signal above a predetermined threshold or a DC or quasi DC current above a predetermined threshold, opening the switch assembly, thereby blocking the DC or quasi DC current to the ground through a DC blocking component electrically connected in parallel with the switch assembly between the neutral of the electrical equipment and the ground.

21. The method of claim 20, further comprising, upon detecting that the harmonic signal or DC or quasi DC current is above a second predetermined threshold, activating one or more switches to change a number of DC blocking components included in a path between the transformer neutral and ground.

22. The method of claim 20, wherein detecting a harmonic signal occurs at a harmonic sensor within a control circuit electrically connected to a control input of the switch assembly.

23. The method of claim 20, wherein detecting a DC or quasi DC current occurs at a current sensor within a control circuit electrically connected to a control input of the switch assembly.

24. A method of automatically self-testing an electrical protection circuit comprising:

opening a switch assembly connected between a transformer neutral and a ground;

injecting an alternating current voltage of a different frequency from a transformer voltage frequency onto the transformer neutral;

measuring a current through a DC blocking component while injecting the alternating current voltage;

determining if the measured current represents an electrical characteristic within a present limit; and if outside the preset limit, indicating the presence of a failure in the electrical protection circuit.

25. The method of claim 24, wherein the method of testing is performed automatically at a preset interval.

26. A method of automatically self-testing an electrical protection circuit comprising:

injecting a direct current signal onto the transformer neutral;

determining whether a switch assembly connected between a transformer neutral and a ground opens in response to the direct current signal;

if the switch assembly fails to open, indicating the presence of a failure in the electrical protection circuit.

27. An electrical equipment stand comprising:

a top surface having an open structure;

a plurality of support legs holding the top surface at an elevation above ground, the support legs mounted onto one or more grounded pilings;

electrical equipment positioned on the top surface and electrically connected between a high power transformer and ground;

wherein the electrical equipment includes:

a switch assembly connected between a transformer neutral of a transformer and a ground, the switch assembly having an open position and a closed position, the open position disrupting the path through the switch between the electrical connection and the ground connection, and the closed position establishing a path connecting the electrical connection to the ground connection through the switch assembly, wherein in normal operation of the alternating current electrical device the switch remains in a closed position; and a DC blocking component positioned in parallel with the switch assembly and connected between the grounding connection and the ground.

28. The electrical equipment stand of claim 27, further comprising control electronics positioned proximate to the electrical equipment.

29. The continuous grounding system of claim 9, wherein the overvoltage protection element comprises a surge arrester.

* * * * *